United States Patent
Ezrielev et al.

(10) Patent No.: US 12,222,814 B2
(45) Date of Patent: Feb. 11, 2025

(54) VALUE-DRIVEN PRIORITIZATION OF BACKUPS THROUGH TIME-LIMITED AIRGAP

(71) Applicant: Dell Products L.P., Round Rock, TX (US)

(72) Inventors: Ofir Ezrielev, Beer Sheva (IL); Jehuda Shemer, Kfar Saba (IL); Amihai Savir, Newton, MA (US)

(73) Assignee: Dell Products L.P., Round Rock, TX (US)

( * ) Notice: Subject to any disclaimer, the term of this patent is extended or adjusted under 35 U.S.C. 154(b) by 14 days.

(21) Appl. No.: 17/937,981

(22) Filed: Oct. 4, 2022

(65) Prior Publication Data
US 2024/0111631 A1  Apr. 4, 2024

(51) Int. Cl.
*G06F 11/14* (2006.01)
(52) U.S. Cl.
CPC ...... *G06F 11/1451* (2013.01); *G06F 11/1456* (2013.01)
(58) Field of Classification Search
None
See application file for complete search history.

(56) References Cited

U.S. PATENT DOCUMENTS

| | | | | |
|---|---|---|---|---|
| 2020/0320215 A1* | 10/2020 | Bhosale | ............. | G06F 11/1461 |
| 2021/0019235 A1* | 1/2021 | Savir | ....................... | G06F 40/30 |
| 2022/0114062 A1* | 4/2022 | Madan | ................ | G06F 11/1469 |
| 2023/0125145 A1* | 4/2023 | Gunda | .................... | G06F 3/062 |
| | | | | 711/162 |
| 2023/0153438 A1* | 5/2023 | Bhagi | ..................... | G06F 21/78 |
| | | | | 726/26 |
| 2023/0168973 A1* | 6/2023 | Radhakrishnan | ... | G06F 11/1469 |
| | | | | 709/227 |
| 2024/0256658 A1* | 8/2024 | Madan | ................. | G06F 21/554 |

* cited by examiner

*Primary Examiner* — Charles Rones
*Assistant Examiner* — Ryan Dare
(74) *Attorney, Agent, or Firm* — Workman Nydegger

(57) ABSTRACT

One example method includes assigning, at a production site, a priority to a portion of a dataset to be backed up, checking to determine if the priority meets or exceeds a threshold priority; and, when the priority meets or exceeds the threshold priority, and when an air gap between the production site and a storage vault is closed, backing up, by way of the closed air gap, the portion of the dataset to the storage vault.

20 Claims, 3 Drawing Sheets

VALUE-DRIVEN PRIORITIZATION OF BACKUPS THROUGH TIME-LIMITED AIRGAP

FIELD OF THE INVENTION

Embodiments of the present invention generally relate to data protection and recovery. More particularly, at least some embodiments of the invention relate to systems, hardware, software, computer-readable media, and methods, for controlling the prioritization of data for storage in an air gapped vault.

BACKGROUND

It is often the case that the data of an enterprise or other entity may have varying priorities in terms of the need for protection. However, at least some data protection systems fail to account for the relative differences in priority as among the data that is backed up, or to be backed up.

Consider, for example, a case where backup data is to be stored in an air gapped vault. In such arrangements, the air gap must be closed from time to time in order to enable data to be written, that is, backed up, to the vault. In some instances, it may be the case that there is a time limit on the amount of time that the air gap can be closed for data transfer. Thus, not all of the backup data may be stored during the time that the air gap is closed.

As a result, an enterprise may find itself in a situation where not all of its data is protected because the air gap was reopened before all the data could be backed up. If a problem were to occur before the next closing of the air gap, the data that was not backed up could be compromised. Moreover, the enterprise has no assurance as to whether or not any high priority data was completely backed up.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
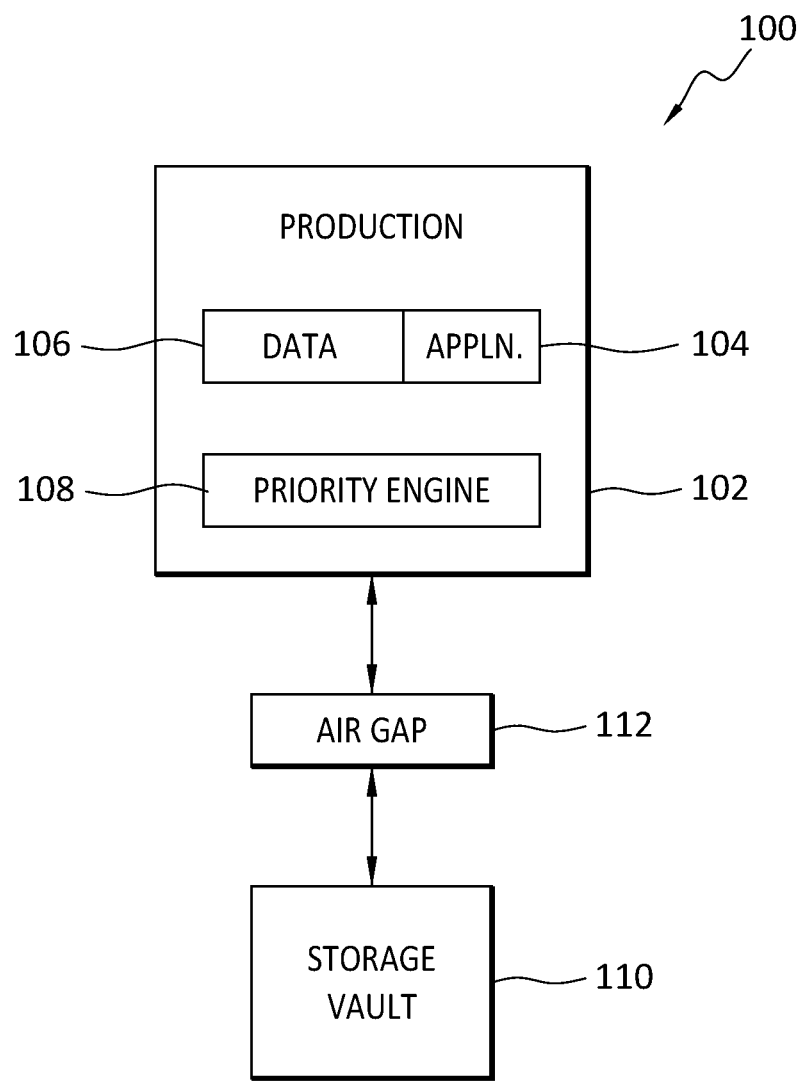
FIG. 1 discloses aspects of an example architecture according to an embodiment.

Embodiments of the present invention generally relate to data protection and recovery. More particularly, at least some embodiments of the invention relate to systems, hardware, software, computer-readable media, and methods, for controlling the prioritization of data for storage in an air gapped vault.

In general, example embodiments of the invention may use a data value score to control the prioritization of backups when there is a limit to the amount of time that an air gap will be closed, and all of the data cannot be backed up within the window of time when the air gap is closed. In more detail, an embodiment may order data and/or applications, based on their respective values relative to each other, and then transmit the data and/or applications to the vault in order of decreasing value. In this way, the data to be backed up may be prioritized for storage according to relative value.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that data may be prioritized for backup based on its relative value, so that some assurance may be had that higher priority data, at least, is backed up during a limited time window during which an air gap to a vault is closed. An embodiment may enable the backup of data, according to priority, across multiple time windows during which an air gap to a storage vault is closed. Various other advantages of some embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Aspects of an Example Architecture and Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/ or cause the implementation of, data protection operations which may include, but are not limited to, data replication operations, 10 replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, and storage environments such as the Dell PowerProtect Cyber Recovery system. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM), containerized computing solutions, mobile devices, IoT (Internet of Things) systems and devices, edge devices and systems, and any other systems and devices, which may comprise hardware and/or software, that are capable of generating new and/or modified data.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

With attention now to FIG. 1, details are provided concerning an example architecture and environment, generally denoted at 100, in connection with which some embodiments may be implemented. The information disclosed in FIG. 1 is provided only by way of illustration, and is not intended to limit the scope of the invention in any way.

As shown, a production site 102 may include various applications 104, which may be of any kind, that may carry out operations including, but not limited to, data creation, data modification, data deletion, and data replication. To this end, the production site 102 may store data 106 generated by the applications 104 until such time as that data 106 can be backed up. The data 106 may comprise, for example, one or more backup datasets, directories, and/or any other groupings of data.

The production site 102 may also include a priority engine 108 that may operate to determine and/or assign, possibly based on user or administrator input, or possibly automatically based on established criteria, relative priorities as among different portions of the data 106, so as to enable backup of the portions of the data 106 based on order of priority. Thus, for example, data 106 may be backed up in order of decreasing priority with the highest priority data backed up first, and the lowest priority data backed up last. In an embodiment, the priority engine 108 may automatically parse the data 106, to determine backup priority, whenever a backup dataset is created, and/or, in an embodiment, the priority engine 108 may parse the data 106 on an ad hoc, periodic, or other, basis. In another embodiment, the priority engine 108 may be hosted in a vault, an example of which is denoted at 110 and discussed below.

In an embodiment, the relative priority of different portions of the data 106 for backup may be based on the relative values respectively assigned to the various portions of the data 106. Thus, for example, business intelligence data may be relatively more valuable to an enterprise than employee expense account data and, as such, the business intelligence data may have a higher priority and thus be backed up before the employee expense account data is backed up. Note that the priority of data may be relative, or absolute. To illustrate, business intelligence may be more intrinsically important to the enterprise than employee expense data. Viewed from another perspective, the business intelligence data, for the past day for example, may have an estimated monetary value of $57,300, while the employee expense data may have an estimated monetary value of $13,101. Thus, this latter perspective employs an absolute value from which the priority of the data can be derived. A variety of approaches may be used in estimating the value, such as the monetary value, of data. Value estimates may include tangible and intangible components, for example, the loss of a transaction may have a tangible value equal to the amount of the transaction, and there may be other related components, such as recovery costs, PR costs, customer trust, future business, and reputation, for example, that may be intangible in nature.

With continued reference to FIG. 1, the production site 102 may communicate, possibly on a selective basis, with a data storage vault 110, or simply 'vault,' by way of an air gap 112. Note that as used herein, an 'air gap' embraces a physical isolation, or separation, of a storage vault from any exterior system or device that may be susceptible to attack. That is, when the air gap associated with a vault is open, the air gapped vault is physically detached, and unconnected, from such exterior devices. As such, when the air gap is open, the air gapped vault is not accessible by any form of wireless, or hardwire, including optical, communication system or device. Conversely, when the air gap is closed, the vault, and some or all of its contents, may be accessible by external systems and devices, such as an application host for example, whether by wireless and/or hardwired communication channels.

In some embodiments, the vault 110 may comprise a Dell PowerProtect Cyber Recovery vault, but no particular vault is required. The vault 110 and part, or all, of its contents, may be isolated from the production site 102, and other external entities, when the air gap 112 is open. When the air gap 112 is closed, the vault 110 may be able to communicate with the production site 102 to transfer data, information, and metadata, for example, in either or both directions, between the vault 110 and production site 102, as shown in FIG. 1.

B. Data Prioritization for Vault Storage

With continued reference to the example of FIG. 1, the air gap 112 may be closed for one or more windows of time, one of which may be of a limited length of time. That is, there may be a limited amount of time during which the air gap 112 is closed so that some of the data 106 can be transferred to the storage vault 110. In some circumstances, a window of time during which the air gap 112 is closed may not be long enough to enable a complete backup of all the data 106 to the vault 110. In circumstances such as those just described, different portions of the data 106 may be assigned different respective priorities, such as by the priority engine 108 for example. As a result of an example prioritization scheme, various portions 1-n (where 'n' is any positive integer equal to, or greater, than 2) of the data 106 may be assigned respective priorities for storage in the vault 110. The priorities may be expressed numerically, for example, from 1-5, with '1' being the highest priority, and '5' the lowest priority. As another example, the priorities may be expressed in a non-numerical fashion, such as 'low,' 'medium,' and 'high' priority. Any other prioritization scheme may be employed however. As noted earlier herein, the priority of data may correspond to its value, relative to other data. As used herein, the 'value' of data embraces, but is not limited to, the business value of the data, that is, the relative value of that data to the enterprise that generated, and/or caused the generation of, that data.

After the portions of data 106 have been assigned their respective priorities, a backup plan may be defined and implemented that transmits the portions of the data 106 to the vault 110 according to the respective priorities of those data portions. Typically, but not necessarily always, the data 106 with the highest priority is stored in the vault 110 first.

As suggested earlier herein, it may be the case that not all of the data 106 can be stored during the time frame that the air gap 112 is closed. Thus, storage of the data 106 in the vault 110, according to relative priority of the data, may continue until the air gap 112 is opened, preventing further transfer of data from the production site 102 to the vault 110. Any data not transferred to the vault 110 during that time window may be transferred during the next time window that the air gap is closed 112.

Note that the un-transferred data may, or may not, be highest priority for transfer during the next time window that the air gap is closed 112. In an embodiment, the un-transferred data may be assigned a highest priority for transfer during the next time window that the air gap 112 is closed, thus overriding any other priorities assigned to data that is to be transferred during that next time window. In this way, a complete backup of all the data 106 may be assured, even though the backup of all the data 106 is spread over multiple time windows when the air gap 112 is closed. In another embodiment, a different approach may be taken.

To illustrate, in one example of an edge case, there may be parts of the data 106 that are never protected, as their value is repeatedly identified as being lower that the value of other parts of the data 106. That is, in this case, a lower priority portion of the data 106 may not transferred to the vault 110 during a first time window that the air gap 112 is closed, retains its same, relatively lower, priority during a next time window and, as a result, may not be transferred to the vault in that next time window either.

An embodiment may address this circumstance with low/lower priority portion of the data 106 by modifying, possibly incrementally, the priority, which may be expressed numerically, of that portion of the data 106. This may be implemented, for example, with the use of a monotonically increasing function, such as an exponential function for example, over the time passed since that portion of the data 106 was last stored in the vault 110. This approach may be thought of as imparting 'eventual protection' to the low/lower priority of the portion of data 106 since, through the use of the increasing function which may be used to increment the priority of the portion of the data 106 after each time window that such portion is not protected, that portion of the data 106, even though it may have intrinsically less value than other portions of the data 106, will eventually have a sufficiently high priority to be transferred to the vault 110 during a time when the air gap 112 is closed, notwithstanding its lower intrinsic value.

Thus, an embodiment may control prioritization of protection through a time-limited airgap by value scoring, and some embodiments may further employ a time-based modifier with respect to the priority of low/lower value data. Note that although this eventual protection approach may lead to the protection of relatively lower value data by storage of that portion of the data 106 in the vault 110, that portion of the data 106 may be backed up relatively less frequently than a portion of the data 106 with a relatively higher initial priority, since the backup of the portion of the data 106 with the initially low/lower priority may not be performed until such time as the priority of the portion of the data 106 reaches a sufficiently high threshold level.

As discussed above, an embodiment may employ a mechanism to adjust the priority of data over time, so as to ensure that the data will eventually be backed up. Various other mechanisms for this are possible. For example, the relative scoring for priority adjustment over time may be determined by the ratio of the monetary estimates of the value of the data. To illustrate, lower priority data may initially be assigned a value of $5, while higher priority data may be assigned a value of $10, such that the initial ratio of the value of the lower priority data to the value of the higher priority data is 0.5. Over time, the monetary value of the lower priority data may be adjusted upward, so as to impart a consequent increase to the value ratio. When the value ratio reaches a specified threshold, such as 0.8 for example, the lower priority data may then be backed up. In another approach, interest rates, a monotonically increasing function, may be applied to the monetary data values so that their value increases over time until the sum [compound value+ interest] achieves a threshold level.

Finally, it is noted that the adjustment of the priority does not have to use the same function for all data. Different mechanisms for priority adjustments may be used for different data types, or between applications. Moreover, and while an embodiment may employ linear increases in a priority of data, the scope of the invention is not so limited. Rather, and as illustrated by the aforementioned interest rate example in which compound interest behaves exponentially, embodiments may employ non-linear approaches in incrementing a priority value of data.

C. Example Methods

Figure 2:
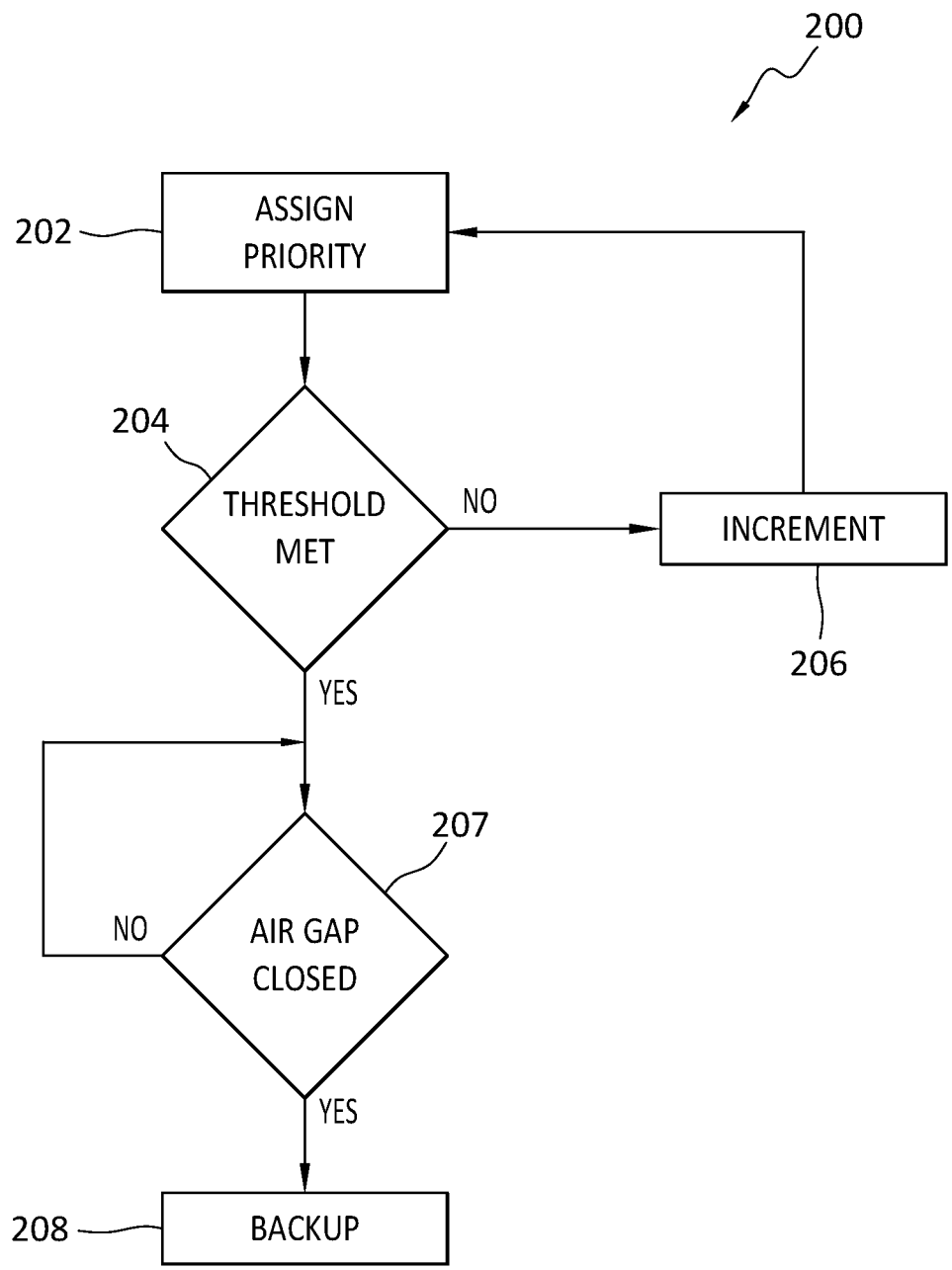
FIG. 2 discloses aspects of an example method according to an embodiment.

It is noted with respect to the disclosed methods, including the example method of FIG. 2, that any operation(s) of any of these methods, may be performed in response to, as a result of, and/or based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 2, an example of a method according to an embodiment of the invention is denoted generally at 200. The method 200 may be performed by various entities such as, for example, a vault, a production site, or may be cooperatively performed by multiple entities, examples of which include a vault and a product site. No particular entity, or combination of entities, is necessarily required however.

The method 200 may begin with assignment 202 of a priority to a portion of data. The data may be part of a backup dataset that has been created, such as at a production site for example. Next, a check 204 may be performed to determine if the priority of the portion of data meets or exceeds a threshold such that the portion of data is eligible to be backed up during the next closure of an air gap. If the threshold is not met, the priority may be incremented 206 and the updated priority value assigned 202 to the data portion.

On the other hand, if the check 204 reveals that the threshold priority has been met or exceeded, a further check 207 may be performed to determine if the air gap is closed, such that the data portion can be backed up to the vault. If the air gap is determined to be open, the method 200 may continue to check 207 until it is determined that the air gap has closed. In either case, when it is determined that the air gap is closed, the data portion may then be backed 208 up to the vault. For any data whose priority has changed during the course of performance of the method 200, or has changed since it was initially assigned, that priority may, after the backup 208 has been completed, revert to its initial value.

D. Further Example Embodiments

Following are some further example embodiments of the invention. These are presented only by way of example and are not intended to limit the scope of the invention in any way.

Embodiment 1. A method, comprising: assigning, at a production site, a priority to a portion of a dataset to be backed up; checking to determine if the priority meets or exceeds a threshold priority; and when the priority meets or exceeds the threshold priority, and when an air gap between the production site and a storage vault is closed, backing up, by way of the closed air gap, the portion of the dataset to the storage vault.

Embodiment 2. The method as recited in embodiment 1, wherein when the priority does not meet or exceed the threshold priority, the priority is incremented to define an updated priority, and the updated priority is assigned to the portion of data.

Embodiment 3. The method as recited in embodiment 2, wherein the incrementing is performed using monotonically increasing function.

Embodiment 4. The method as recited in any of embodiments 1-3, wherein the priority of the portion of data corresponds to a value of the portion of data, relative to the respective values of one or more other portions of data in the dataset.

Embodiment 5. The method as recited in any of embodiments 1-4, wherein less than all data of the dataset is backed up when the air gap is closed.

Embodiment 6. The method as recited in any of embodiments 1-5, wherein any portion of the dataset that is not backed up when the air gap is closed, is eventually backed up during one or more future closures of the air gap.

Embodiment 7. The method as recited in any of embodiments 1-6, wherein data in the dataset is backed up to the storage vault in order of decreasing priority of the data.

Embodiment 8. The method as recited in any of embodiments 1-7, wherein the priority of the portion of the data is determined by parsing of the dataset, or is automatically assigned.

Embodiment 9. The method as recited in any of embodiments 1-8, wherein another portion of the dataset has a priority such that absent any change to that priority of the another portion, that another portion would never be backed up to the vault.

Embodiment 10. The method as recited in any of embodiments 1-9, wherein the priority of the portion of the dataset corresponds to a business value of the portion of the dataset.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

E. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 3:
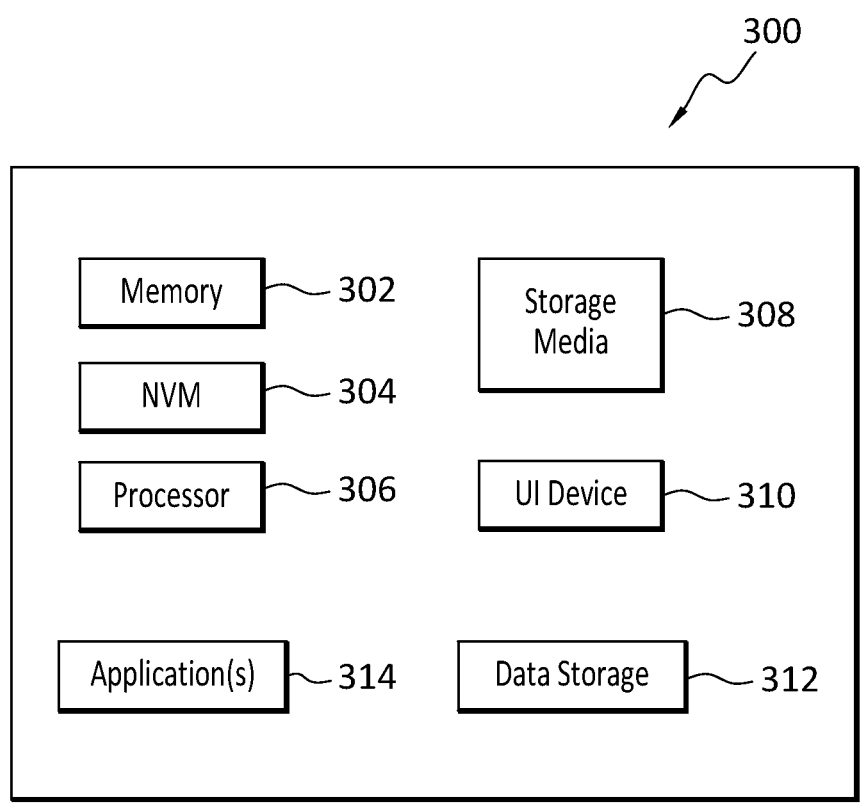
FIG. 3 discloses aspects of an example computing entity operable to perform any of the disclosed methods, processes, and operations.

With reference briefly now to FIG. 3, any one or more of the entities disclosed, or implied, by FIGS. 1-2 and/or elsewhere herein, may take the form of, or include, or be implemented on, or hosted by, a physical computing device, one example of which is denoted at 300. As well, where any of the aforementioned elements comprise or consist of a virtual machine (VM), that VM may constitute a virtualization of any combination of the physical components disclosed in FIG. 3.

In the example of FIG. 3, the physical computing device 300 includes a memory 302 which may include one, some, or all, of random access memory (RAM), non-volatile memory (NVM) 304 such as NVRAM for example, read-only memory (ROM), and persistent memory, one or more hardware processors 306, non-transitory storage media 308, UI (user interface) device 310, and data storage 312. One or more of the memory components 302 of the physical computing device 300 may take the form of solid state device (SSD) storage. As well, one or more applications 314 may be provided that comprise instructions executable by one or more hardware processors 306 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
assigning, at a production site, a priority to one portion of a dataset to be backed up, and the one portion is one of a group of portions that together make up the dataset, and a respective priority of each of the portions of the dataset is relative to the respective priorities of the other portions of the dataset;
and
when an air gap between the production site and a storage vault is closed, and based on a relationship between the priority of the one portion and the respective priorities of one or more of the other portions, backing up, by way of the closed air gap, the one portion of the dataset to the storage vault.

2. The method as recited in claim 1, wherein when the priority of the one portion does not meet or exceed a threshold priority, the priority is incremented to define an updated priority, and the updated priority is assigned to the one portion of data.

3. The method as recited in claim 2, wherein the incrementing is performed using a monotonically increasing function.

4. The method as recited in claim 1, wherein the priority of the one portion of the data corresponds to a value of the one portion of the data, relative to respective values of the other portions of data in the dataset.

5. The method as recited in claim 1, wherein less than all data of the dataset is backed up when the air gap is closed.

6. The method as recited in claim 1, wherein any of the portions of the dataset that is not backed up when the air gap is closed, is eventually backed up during one or more future closures of the air gap.

7. The method as recited in claim 1, wherein data in the dataset is backed up to the storage vault in order of decreasing priority of the data.

8. The method as recited in claim 1, wherein the priority of the one portion of the data is determined by parsing of the dataset, or is automatically assigned.

9. The method as recited in claim 1, wherein the priority of one of the other portions of the dataset is such that absent any change to that priority of the other portion, that other portion would never be backed up to the vault.

10. The method as recited in claim 1, wherein the priority of the one portion of the dataset corresponds to a business value of the one portion of the dataset.

11. A non-transitory storage medium having stored therein instructions that are executable by one or more hardware processors to perform operations comprising:

assigning, at a production site, a priority to one portion of a dataset to be backed up, and the one portion is one of a group of portions that together make up the dataset, and a respective priority of each of the portions of the dataset is relative to the respective priorities of the other portions of the dataset; and when an air gap between the production site and a storage vault is closed, and based on a relationship between the priority of the one portion and the respective priorities of one or more of the other portions, backing up, by way of the closed air gap, the one portion of the dataset to the storage vault.

12. The non-transitory storage medium as recited in claim 11, wherein when the priority of the one portion does not meet or exceed a threshold priority, the priority is incremented to define an updated priority, and the updated priority is assigned to the one portion of data.

13. The non-transitory storage medium as recited in claim 12, wherein the incrementing is performed using a monotonically increasing function.

14. The non-transitory storage medium as recited in claim 11, wherein the priority of the one portion of the data corresponds to a value of the one portion of the data, relative to respective values of the other portions of data in the dataset.

15. The non-transitory storage medium as recited in claim 11, wherein less than all data of the dataset is backed up when the air gap is closed.

16. The non-transitory storage medium as recited in claim 11, wherein any of the portions of the dataset that is not backed up when the air gap is closed, is eventually backed up during one or more future closures of the air gap.

17. The non-transitory storage medium as recited in claim 11, wherein data in the dataset is backed up to the storage vault in order of decreasing priority of the data.

18. The non-transitory storage medium as recited in claim 11, wherein the priority of the one portion of the data is determined by parsing of the dataset, or is automatically assigned.

19. The non-transitory storage medium as recited in claim 11, wherein the priority of one of the other portions of the dataset is such that absent any change to that priority of the other portion, that other portion would never be backed up to the vault.

20. The non-transitory storage medium as recited in claim 11, wherein the priority of the one portion of the dataset corresponds to a business value of the one portion of the dataset.

* * * * *